Nov. 14, 1933.  B. MERLAU ET AL  1,934,945
STORAGE BATTERY
Filed Dec. 21, 1931
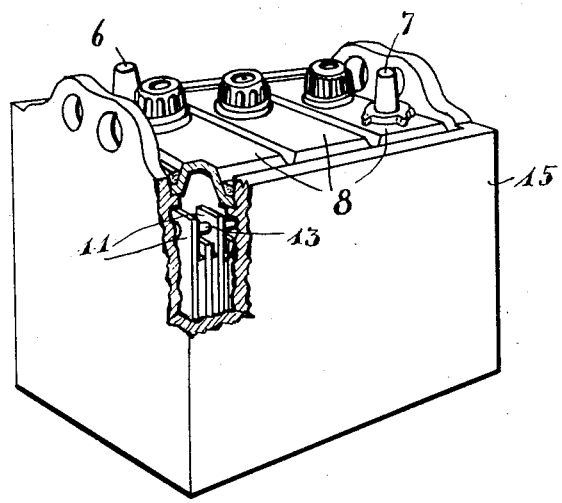
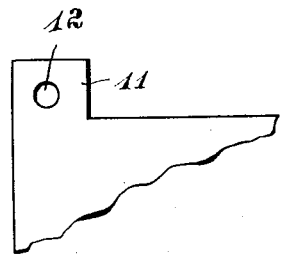
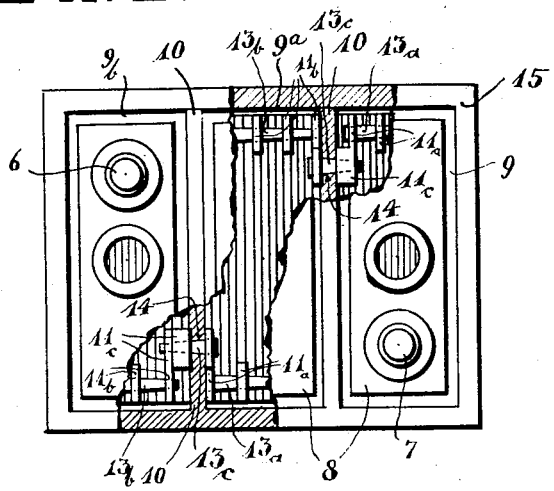
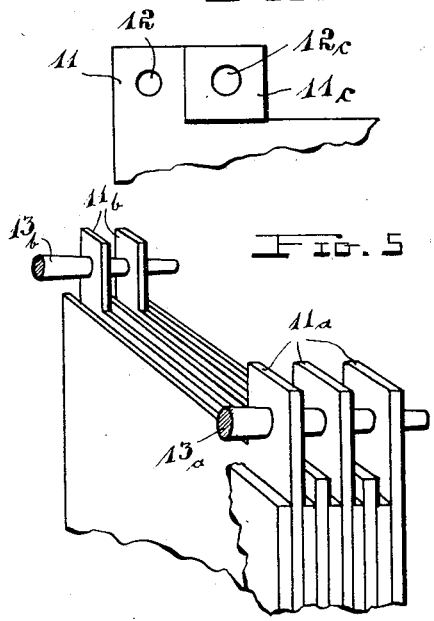
INVENTORS:
BRYAN MERLAU,
JOHN F. McCLELLAND,
By: Otto H. Ringer,
their Atty.

Patented Nov. 14, 1933

1,934,945

UNITED STATES PATENT OFFICE

1,934,945

STORAGE BATTERY

Bryan Merlau, Los Angeles, and John F. Mc-Clelland, Tujunga, Calif.

Application December 21, 1931
Serial No. 582,336

2 Claims. (Cl. 136—134)

This invention relates to devices used for storing and generating electricity, and more particularly to parts thereof by which various elements are interconnected.

One of the objects of this invention is to eliminate outside interconnections between various elements.

Another object is to provide novel connections between various elements within certain sections of a battery as well as between elements in adjoining sections.

Another object is to provide interconnections between elements designed to facilitate the opening and inspection of a battery.

Other objects will appear from the following description and appended claims as well as from the accompanying drawing, in which—

Fig. 1 is a perspective view of a battery partly broken away, to illustrate connections between the elements within the housing of the battery, the top of the battery having no outwardly extending connections except the two extreme terminals of the whole battery.

Fig. 2 is a top plan view of a battery, partly broken away, showing connections between elements within one and the same section and from one section to an adjoining section.

Fig. 3 is a fragmentary side elevation of a single element showing the connecting lug.

Fig. 4 is a fragmentary side elevation of an element with a larger and wider lug for connecting lugs of adjoining elements in the same section of a battery and at the same time serving for the connection of elements in adjoining sections of a battery.

Fig. 5 is a fragmentary perspective view of a few battery-elements with the lugs of the oppositely arranged elements individually connected.

As illustrated in Fig. 1 in the drawing, the lugs appearing commonly over the top of the battery and heavy connections are not present in this present case and only the two extreme terminals 6 and 7, being the lugs to which the line cables are customarily connected, are extending through the top of this battery.

All the various elements of the battery are connected below the top 8, within and between the several sections 9, 9a, and 9b of the battery.

The housing of this battery is provided with partitions 10 in the customary manner, depending on the number of sections desired and required for different batteries.

Within each section or compartment of the battery-housing a suitable number of battery-elements are disposed in the customary manner, and it may be mentioned right here that no particular claim is made or will be made to any particular form of elements as such, except as to the connecting part or portion of the elements, and it must be understood that we do not limit ourselves to any particular form of elements but only to the connections disclosed herewith for any elements for which they may be found suited or suitable.

Instead of bridging the different elements of each section of a whole battery in each of the compartments of the housing and bringing a lug through the top to be connected with a similar lug of another bridged section of elements in an adjoining compartment of the battery by a heavy connecting member over the top of the battery, the different elements in each section are each provided with an apertured lug 11, the apertures being designated by the numeral 12, as indicated and illustrated in Figs. 3 and 4.

From the illustration in Fig. 5 is will be clear that the lugs 11a of one group of one whole section of elements are arranged on one side in the section while the lugs 11b of another group that normally is of the opposite polarity in such a section of a battery is arranged on the opposite side of the section.

Though such elements are, as a rule, of certain peculiar forms and separated by spacers, such details are not specified here in any particular form since they have no particular bearing on the principles of this invention.

The apertures in the several lugs are preferably made of tapered form, either reamed out, or made to fit properly in any other suitable well known manner, however, it is preferable that these apertures be made accurately to fit just as accurately-made pins 13. The particular taper is of no great importance as long as the pins can be pressed in, to become and remain tightly engaged in the apertures. The material of the pins, on the other hand, is preferably selected with the idea of being most suitable in individual cases, such as lead-pins in or with lead-plates, depending on the material of which battery-plates may be made in different batteries.

Two distinct groups of battery-plates being always present in any distinct section of a whole battery, two correspondingly suitable taper pins are provided for such a section, to become located together with the distinct and complete battery-section within one of the compartments of the battery-housing, such pins being indicated at 13a and 13b in Fig. 2.

For connecting the one group of plates of one section in one compartment of a battery with the oppositely polarized or energized group of another section in an adjoining compartment of the same battery, a similarly tapered pin 13c is provided, to operatively connect the outermost plate of one group in one compartment with the outermost plate of the opposite group in the adjoining compartment, in the manner illustrated in Fig. 2, through a tightly fitting tapered hole 14, provided in each of the partitions 10 of the battery-housing 15.

All the outermost plates that are to form the intersection terminals, are for this reason provided with wider lugs as indicated at 11c in Fig. 4 in detail, provided with an extra hole 12c for the pin 13c.

Though each complete section of oppositely disposed plates is as a rule firmly supported within a compartment of a battery-housing, the pin 13c is nevertheless preferably made of stronger material to prevent any undue breakage and at the same time provide for a larger wearing surface in the hole 14 in the partition of the battery-housing.

Having thus described our invention, we claim:—

1. In a storage battery, a plurality of interleaved positive and negative plates, each plate having an apertured lug, the apertures in the lugs in the positive and negative plates being concentric and uniformly tapered and aligned, respectively, and tapered pins firmly disposed within the apertures of the plates to electrically connect the positive and negative plates, respectively.

2. In a storage battery, a plurality of cells, each cell comprising a plurality of interleaved positive and negative plates, each plate having an apertured lug, the apertures in the lugs in the positive and negative plates being concentric and uniformly tapered and aligned, respectively, tapered pins firmly disposed within the apertures of the plates to electrically connect the positive and negative plates, respectively, the outermost positive plate of one cell and the outermost negative plate of the adjoining cell being provided with enlarged lugs having aligned and concentric uniformly tapered apertures, and a tapered pin firmly disposed in the apertures of the last-named lugs to electrically connect adjoining cells in series.

BRYAN MERLAU.
JOHN F. McCLELLAND.